(No Model.)

S. & J. CHANDLER.
GAS PURIFYING APPARATUS.

No. 259,977. Patented June 20, 1882.

Witnesses.
G. F. Redfern
A. J. Abbott

Inventors.
Saml Chandler
Jnh Chandler

UNITED STATES PATENT OFFICE.

SAMUEL CHANDLER AND JOSIAH CHANDLER, OF LONDON, ENGLAND.

GAS-PURIFYING APPARATUS.

SPECIFICATION forming part of Letters Patent No. 259,977, dated June 20, 1882.

Application filed November 2, 1881. (No model.) Patented in England February 18, 1880, No. 728; in France August 29, 1881, No. 144,616, and in Belgium October 24, 1881, No. 56,048.

*To all whom it may concern:*

Be it known that we, SAMUEL CHANDLER and JOSIAH CHANDLER, subjects of the Queen of Great Britain, residing at London, England, have invented new and useful Improvements in Gas-Purifying Apparatus, (for which we have obtained a patent in Great Britain, No. 728, dated 18th February, 1880, sealed 4th May, 1880,) of which the following is a specification.

The apparatus we employ for applying our improvement is a horizontal or vertical vessel made of iron, and is divided into separate compartments, in each of which we place vertical or horizontal sheets of iron or other material, separate or otherwise, extending the whole width of vessel, but terminating at a given distance from top and bottom of same. Each division-plate also terminates at a like distance alternately, so as to give the gas an upward and downward course through the vessel; or, by the employment of additional division-plates, cause the gas to travel always in an upward direction through the clusters of purifying material, and descending the blank bay in each case, and so on through the vessel. We employ a suction and throw pump to each bay for drawing the liquor from bottom of tank and delivering it into a perforated trough, which is situated at top of the vessel, for distributing the liquor over the purifying material for the purposes of purifying gas from impurities, such as ammonia, carbonic acid, and sulphureted hydrogen.

Having indicated what our improvements consist of, we now proceed more fully to describe the nature thereof and the means we employ to carry the same into effect, with reference to the accompanying drawings.

Figure 1:
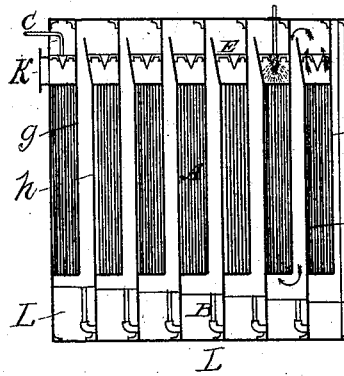
Figure 2:
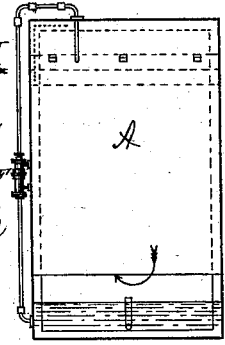
Figure 3:
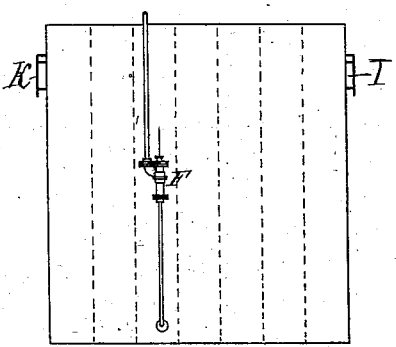
Figure 4:
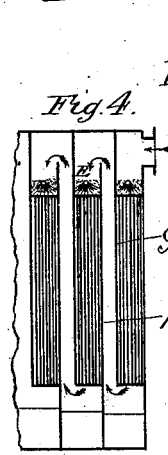
Figure 5:
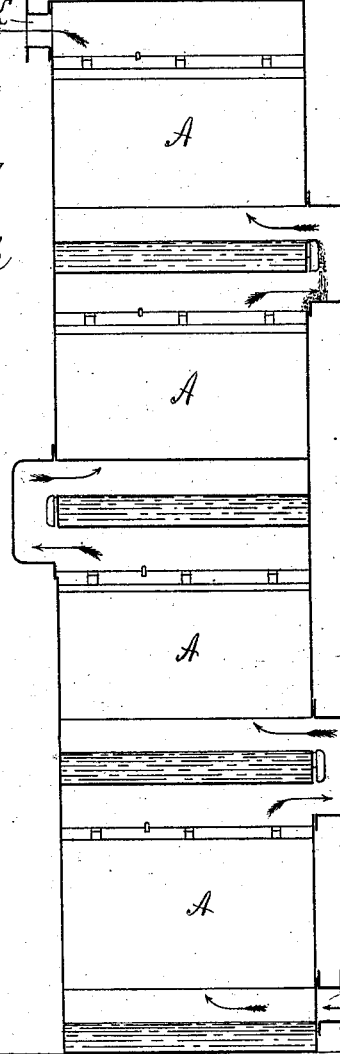
Figure 6:
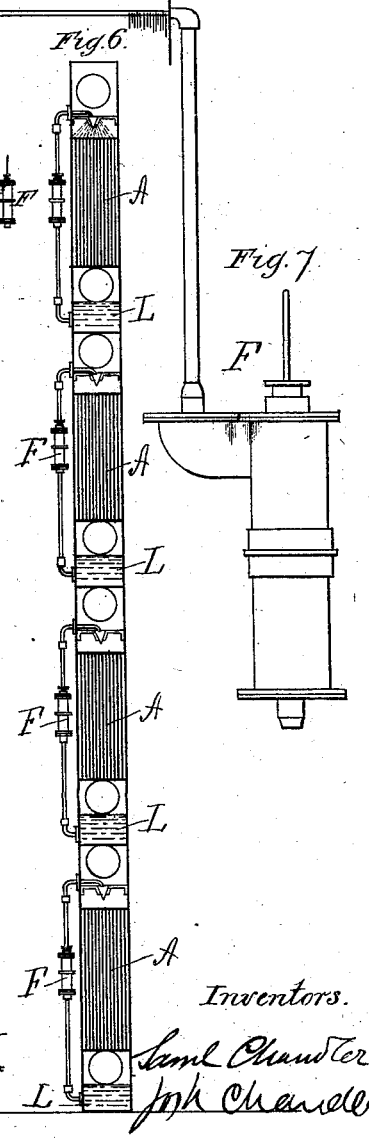
Figure 7:

Figure 1 shows a longitudinal section of an apparatus embodying our invention in which the sets of plates are placed side by side. Fig. 2 is a transverse section of the same. Fig. 3 is an end elevation. Fig. 4 is a detail showing the course of the gas in an opposite direction to Fig. 1. Fig. 5 shows a longitudinal section of an apparatus embodying our invention in which the sets of plates are placed one above another instead of side by side. Fig. 6 is a transverse section of Fig. 5. Fig. 7 represents an ordinary suction and force pump as applied to our distributer.

Fig. 1 on the drawings shows a longitudinal section of a horizontal vessel of square or other form, constructed substantially of cast or wrought iron or other material, the inside of which is divided by partition-plates $g$ and $h$ extending the whole width of the vessel, as shown in transverse section, Fig. 2, but terminating within a given distance from bottom and top of the said vessel alternately, and between these partition-plates, the clusters of scrubbing-plates are placed, which we prefer to make of iron with dimples on them in order to keep the plates apart and allow the gas to pass between. The gas enters at the opening I, passes around the bottom of the partition $g$, up through the scrubbing-plates A, around the top of the partition $h$, and so on, taking a zigzag course until it passes out at the opening K.

In each partition-plate $h$ which extends to the bottom of the tank L we fix an overflow-pipe, (see letter B,) for the purpose of conveying the liquid from compartment to compartment, and so on to the end, from whence it leaves for the ammonia-well.

It will be seen that each pipe is arranged so as to allow the fluid to flow by gravitation.

Clean water is admitted by a pipe at C and leaves at D charged with a strong solution of ammonia and other impurities.

The distributer (marked E) is a pipe of any shape, finely perforated, through which the water or other liquid delivered by the pump percolates and descends on and through the scrubbing material, thus presenting a wetted surface for the purification of the gas.

We employ an ordinary suction and force pump, F, attached to the exterior of the vessel, one to and for the use of each compartment, which, when worked by suitable gearing, draws the liquid from the bottom of the compartment and forces it into the distributer referred to, and so on to the scrubbing material, as previously stated. The course of the gas is as shown by the arrows in Fig. 1; but may be reversed, as indicated by the arrows at Fig. 4.

Fig. 3 shows exterior of Fig. 1. Figs. 5 and 6 show our invention carried out in a vertical vessel, and the course of the gas is shown by arrows, but may be reversed, as in the former case.

We would add that we are aware that the application of pumps for pumping liquor or other solutions over and over again is not a new idea, and that it is also old to purify gas by falling water passing through it; and we are also aware that systems of circular scrubbing-plates connected to and revolving with a revolving shaft have been used for purifying gas. These, therefore, we do not claim; but

What we claim as our invention is—

1. In a gas-purifying apparatus, the combination of the series of partitions $g$ and $h$, constructed and arranged as described, with the series of vertical stationary scrubbing-plates A, substantially as and for the purpose set forth.

2. In a gas-purifying apparatus, the combination of the partitions $g$ and $h$, clusters of scrubbing-plates A, distributers E, tank L, and overflow-pipes B, substantially as shown and described.

SAML. CHANDLER.
JOSH. CHANDLER.

Witnesses:
G. F. REDFERN,
A. ALBUTT.